United States Patent
Yamanaka

(10) Patent No.: US 10,707,589 B2
(45) Date of Patent: Jul. 7, 2020

(54) CONNECTION MODULE

(71) Applicant: TOYOTA JIDOSHA KABUSHIKI KAISHA, Toyota-shi, Aichi-ken (JP)

(72) Inventor: Atsushi Yamanaka, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/535,339

(22) Filed: Aug. 8, 2019

(65) Prior Publication Data

US 2020/0067211 A1 Feb. 27, 2020

(30) Foreign Application Priority Data

Aug. 22, 2018 (JP) .................................. 2018-155445

(51) Int. Cl.
*H01R 4/70* (2006.01)
*H01R 4/34* (2006.01)
(Continued)

(52) U.S. Cl.
CPC .............. *H01R 4/34* (2013.01); *H01M 2/202* (2013.01); *H01R 4/48* (2013.01); *H01R 4/70* (2013.01); *H01M 2/1077* (2013.01); *H01M 2/20* (2013.01); *H01M 2/206* (2013.01); *H01M 10/4207* (2013.01); *H01M 10/482* (2013.01); *H01M 10/6554* (2015.04); *H01R 4/2408* (2013.01); *H01R 4/2429* (2013.01); *H01R 4/30* (2013.01); *H01R 4/36* (2013.01); *H01R 4/44* (2013.01); *H01R 9/223* (2013.01); *H01R 9/226* (2013.01); *H01R 11/281* (2013.01);
(Continued)

(58) Field of Classification Search
CPC .. H01M 2/206; H01M 10/482; H01M 2/1077; H01M 2/20; H01M 2/202; H01M 10/4207; H01M 10/6554; H01R 11/287; H01R 25/162; H01R 11/281; H01R 2201/26; H01R 4/36; H01R 11/288; H01R 4/70; H01R 11/283; H01R 13/44; H01R 4/2408; H01R 4/2429; H01R 4/30; H01R 4/44; H01R 9/223; H01R 9/226; H01R 31/08; H01R 13/7032; H01R 31/085
USPC ....... 439/212, 213, 721, 202, 500, 510, 521, 439/754, 759, 762, 764, 771
See application file for complete search history.

(56) References Cited

U.S. PATENT DOCUMENTS

| 2019/0181584 A1* | 6/2019 | Yamashita | ............. H02G 3/086 |
| 2019/0198849 A1* | 6/2019 | Nakayama | ............. H01M 2/10 |

FOREIGN PATENT DOCUMENTS

JP 2018-041543 A 3/2018

* cited by examiner

*Primary Examiner* — Abdullah A Riyami
*Assistant Examiner* — Justin M Kratt
(74) *Attorney, Agent, or Firm* — Sughrue Mion, PLLC

(57) ABSTRACT

A connection module includes a first bus bar, a second bus bar and a connection unit. The connection unit includes a housing case having an insulation property and having a housing space formed therein, and a fastening member disposed inside the housing space. The connection unit is provided with a tool insertion hole through which a tool to be attached to the fastening member is insertable. The fastening member is configured to electrically connect the first bus bar and the second bus bar that are disposed inside the housing space. An insulation member is disposed in a portion of the fastening member that is visible through the tool insertion hole when the fastening member is seen through the tool insertion hole.

4 Claims, 18 Drawing Sheets

(51) Int. Cl.
  *H01M 2/20*   (2006.01)
  *H01R 4/48*   (2006.01)
  *H01R 13/703*   (2006.01)
  *H01R 4/2429*   (2018.01)
  *H01R 25/16*   (2006.01)
  *H01R 13/44*   (2006.01)
  *H01R 9/22*   (2006.01)
  *H01R 31/08*   (2006.01)
  *H01R 4/30*   (2006.01)
  *H01R 11/28*   (2006.01)
  *H01M 10/48*   (2006.01)
  *H01R 4/2408*   (2018.01)
  *H01M 10/6554*   (2014.01)
  *H01M 10/42*   (2006.01)
  *H01R 4/44*   (2006.01)
  *H01R 4/36*   (2006.01)
  *H01M 2/10*   (2006.01)

(52) U.S. Cl.
  CPC .......... *H01R 11/283* (2013.01); *H01R 11/287* (2013.01); *H01R 11/288* (2013.01); *H01R 13/44* (2013.01); *H01R 13/7032* (2013.01); *H01R 25/162* (2013.01); *H01R 31/08* (2013.01); *H01R 31/085* (2013.01); *H01R 2201/26* (2013.01)

CONNECTION MODULE

This nonprovisional application is based on Japanese Patent Application No. 2018-155445 filed on Aug. 22, 2018 with the Japan Patent Office, the entire contents of which are hereby incorporated by reference.

BACKGROUND

Field

The present disclosure relates to a connection module.

Description of the Background Art

The power storage device disclosed in Japanese Patent Laying-Open No. 2018-41543 includes a plurality of power storage modules, a bus bar configured to electrically connect the plurality of power storage modules in series, and an insulation member.

The power storage modules are arranged in the right-left direction. Each of the power storage modules includes a positive electrode external terminal and a negative electrode external terminal.

The bus bar connects the external terminals of the power storage modules located adjacent to each other in the right-left direction such that the power storage modules adjacent to each other are electrically connected in series.

The bus bar includes a coupling portion, a first extending portion and a second extending portion. The coupling portion extends in the right-left direction. The first extending portion is connected to one end of the coupling portion while the second extending portion is connected to the other end of the coupling portion.

The first extending portion is connected to the positive electrode external terminal of one of the power storage modules adjacent to each other in the right-left direction. The second extending portion is connected to the negative electrode external terminal of the other one of the power storage modules.

The insulation member covers a part of the bus bar. An end portion of the first extending portion and an end portion of the second extending portion are exposed from the insulation member.

SUMMARY

In the power storage device configured as described above, the end portion of the first extending portion and the end portion of the second extending portion are exposed from the insulation member. Thus, when the bus bar is connected to an external terminal, an operator may touch the first extending portion or the second extending portion.

The present disclosure has been made in consideration of the above-described problems. An object of the present disclosure is to provide a connection module for connecting bus bars that is configured to suppress an operator from touching a bus bar when connecting the bus bars to each other.

A connection module according to the present disclosure includes: a first bus bar; a second bus bar; and a connection unit configured to electrically connect the first bus bar and the second bus bar. The connection unit includes a housing case having an insulation property and having a housing space formed therein, and a fastening member disposed inside the housing space. The connection unit is provided with a tool insertion hole through which an outside of the housing case and the housing space are in communication with each other, and through which a tool to be attached to the fastening member is insertable. The fastening member is configured to electrically connect the first bus bar and the second bus bar that are disposed inside the housing space. An insulation member is disposed in a portion of the fastening member that is visible through the tool insertion hole when the fastening member is seen through the tool insertion hole.

According to the above-described connection module, when the first bus bar and the second bus bar are fastened, the first bus bar and the second bus bar are to be fastened inside the housing case having an insulation property, thereby suppressing the operator from touching the fastening portion for the first bus bar and the second bus bar. Furthermore, even when the operator's finger is introduced through the tool insertion hole into the connection unit, the finger is more likely to touch the insulation member of the fastening member.

In the above-described connection module, when the tool is attached to the fastening member, the tool is in contact with the insulation member. The above-described connection module can suppress the operator from touching the metal portion of the fastening member through the tool.

In the above-described connection module, the fastening member includes a nut and a bolt that is adapted to the nut. The bolt includes a head portion and a shank portion that is connected to the head portion. The insulation member is provided in the head portion.

According to the above-described connection module, a bolt and a nut each are employed as a fastening member. The first bus bar and the second bus bar are sandwiched between the bolt and the nut. Thereby, even when the fastening member is reduced in structural size, the surface pressure between the first bus bar and the second bus bar can be ensured. Thus, the electrical resistance between the first bus bar and the second bus bar can be reduced. Also, when the tool is attached to the bolt, contact of the tool with the metal portion of the bolt can be suppressed.

In the above-described connection module, the connection module further includes an elastic member disposed inside the housing space. The nut is provided with a through hole. The first bus bar includes a first seat portion provided with a first insertion hole through which the shank portion is inserted. The first seat portion is disposed inside the housing space. The second bus bar includes a second seat portion provided with a second insertion hole through which the shank portion is inserted. The second seat portion is disposed inside the housing space. The first seat portion is disposed in the nut so as to allow communication between the first insertion hole and the through hole. The second seat portion is disposed in the first seat portion so as to allow communication between the second insertion hole and the first insertion hole. The head portion is disposed in the second seat portion. The elastic member is configured to urge the second seat portion toward the tool insertion hole.

According to the above-described connection module, in the state where the bolt and the nut are unscrewed from each other, the bolt is located in the vicinity of the tool insertion hole. Accordingly, when the first bus bar and the second bus bar are fastened, the operator can readily attach the tool to the bolt.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
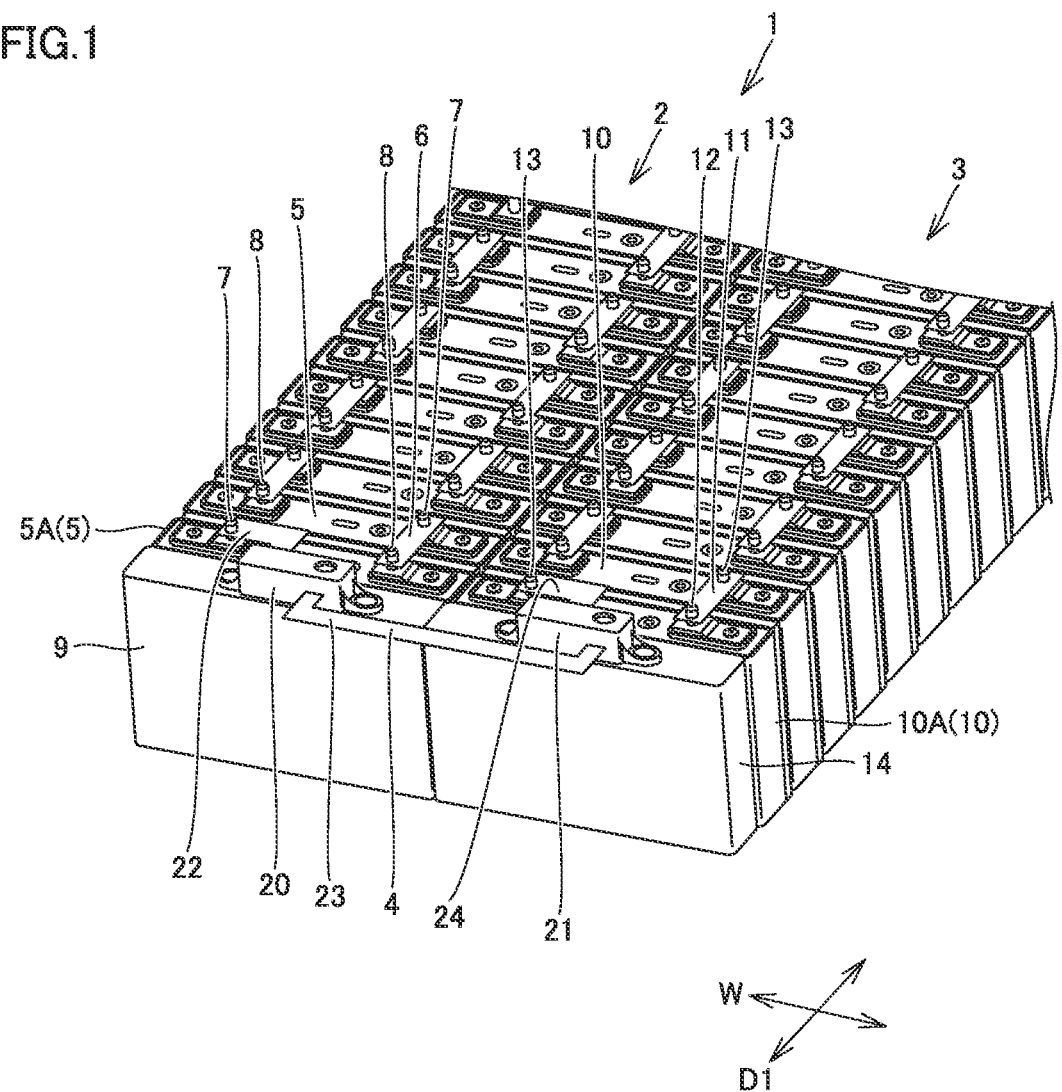
FIG. 1 is a perspective view showing a part of a power storage device 1 according to the present first embodiment.

Referring to FIGS. 1 to 27, a connection module according to the present embodiment will be hereinafter described. Among the components shown in FIGS. 1 to 27, the same or substantially the same components will be designated by the same reference characters, and the description thereof will not be repeated. Among the components described in the first to third embodiments, the components corresponding to the components recited in the claims may be described in the embodiments together with parenthesized names of the components recited in the claims.

First Embodiment

FIG. 1 is a perspective view showing a part of a power storage device 1 according to the present first embodiment. Power storage device 1 includes power storage modules 2, 3 and a connection module 4.

Power storage modules 2 and 3 are disposed so as to be adjacent to each other in a width direction W.

Power storage module 2 includes a plurality of power storage cells 5, a plurality of cell-to-cell bus bars 6, and an end plate 9.

Power storage cells 5 are arranged in an arrangement direction D1. Each of power storage cells 5 includes a positive electrode terminal 7 and a negative electrode terminal 8. Also, each of cell-to-cell bus bars 6 connects positive electrode terminal 7 of one power storage cell 5 and negative electrode terminal 8 of another power storage cell 5 that is adjacent to the one power storage cell 5 in arrangement direction D1. Cell-to-cell bus bar 6 electrically connects power storage cells 5 in series that are located adjacent to each other in arrangement direction D1. End plate 9 is provided at one end of power storage module 2 in arrangement direction D1.

A power storage cell 5A located adjacent to end plate 9 has negative electrode terminal 8 to which cell-to-cell bus bar 6 is connected.

Power storage module 3 includes a plurality of power storage cells 10, a plurality of cell-to-cell bus bars 11, and an end plate 14. Each of power storage cells 10 includes a positive electrode terminal 12 and a negative electrode terminal 13. Power storage cells 10 are arranged in arrangement direction D1. Cell-to-cell bus bar 11 connects positive electrode terminal 12 of one power storage cell 10 and negative electrode terminal 13 of another power storage cell 10 that is adjacent to the one power storage cell 10 in arrangement direction D1. Cell-to-cell bus bar 11 also electrically connects power storage cells 10 in series that are located adjacent to each other in arrangement direction D1. End plate 14 is disposed at one end of power storage module 3 in arrangement direction D1.

A power storage cell 10A located adjacent to end plate 14 has positive electrode terminal 12 to which cell-to-cell bus bar 11 is connected.

Connection module 4 includes connection units 20 and 21, and bus bars 22, 23, and 24.

Connection unit 20 is provided on the upper surface of end plate 9 of power storage module 2 while connection unit 21 is provided on the upper surface of end plate 14 of power storage module 3.

Bus bar (the first bus bar) 22 is connected to positive electrode terminal 7 of power storage cell 5A and connection unit 20. Bus bar (the second bus bar) 23 is connected to connection units 20 and 21. Bus bar 24 is connected to connection unit 21 and negative electrode terminal 13 of power storage cell 10A.

Since connection units 20 and 21 have substantially the same configuration, connection unit 20 will be hereinafter described in detail.

Figure 2:
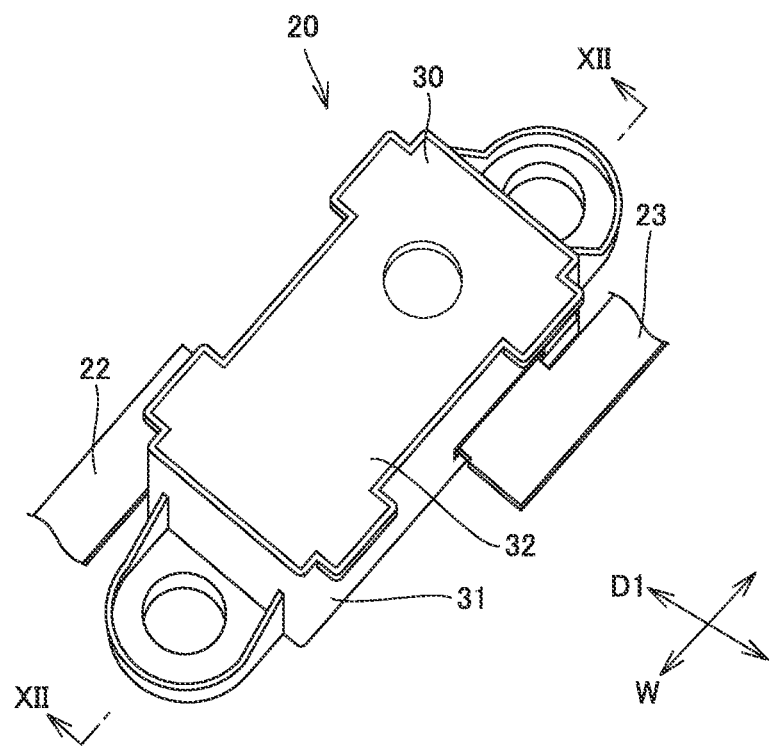
FIG. 2 is a perspective view showing a connection unit 20 and parts of bus bars 22 and 23.

FIG. 2 is a perspective view showing connection unit 20 and parts of bus bars 22 and 23.

Connection unit 20 includes a housing case 30 made of an insulating material such as a resin. Housing case 30 includes a case body 31 and a cover 32.

Figure 3:
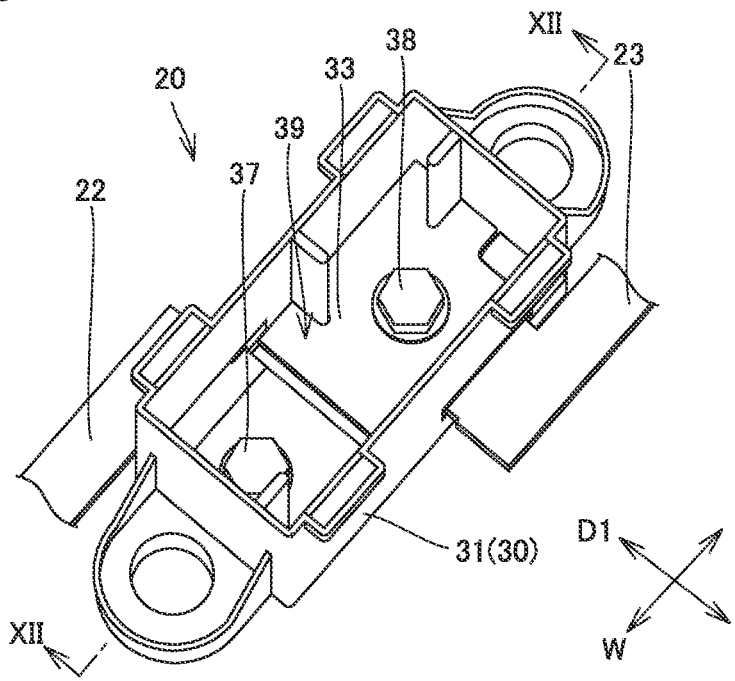
FIG. 3 is a perspective view showing connection unit 20 from which a cover 32 is removed, and parts of bus bars 22 and 23.
Figure 4:
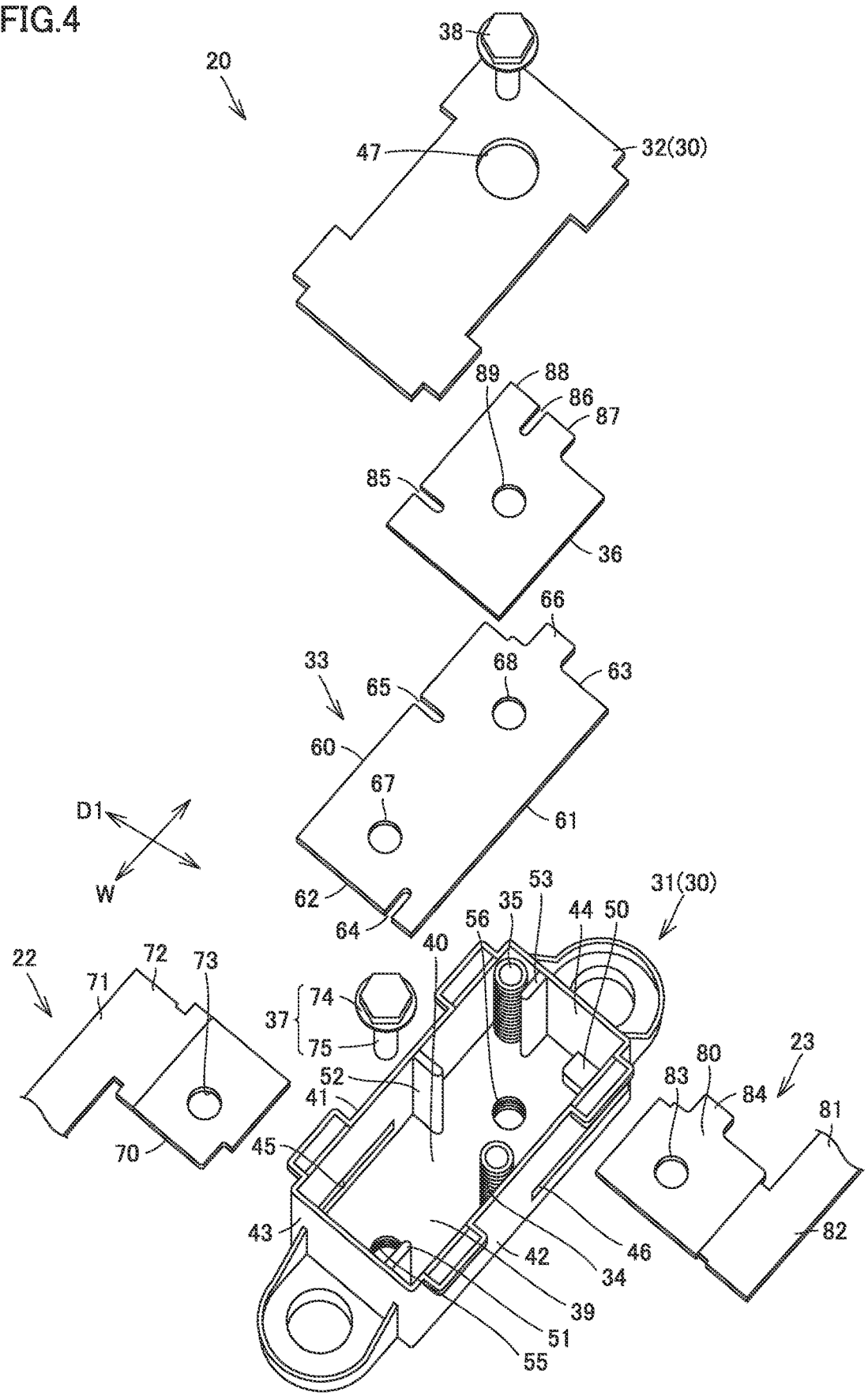
FIG. 4 is an exploded perspective view of connection unit 20.

FIG. 3 is a perspective view showing connection unit 20 from which cover 32 is removed, and parts of bus bars 22 and 23. FIG. 4 is an exploded perspective view of connection unit 20.

In FIGS. 3 and 4, connection unit 20 includes a housing case 30, a connection plate 33, elastic members 34 and 35, a metal plate 36, and bolts 37 and 38.

On the inside of housing case 30, a housing space 39 is provided, in which connection plate 33, elastic members 34 and 35, metal plate 36, and bolts 37 and 38 are housed.

Cover 32 is formed in a plate shape and provided with a tool insertion hole 47.

Case body 31 includes a bottom plate 40, long side walls 41 and 42, and end side walls 43 and 44. Long side walls 41, 42 and end side walls 43, 44 are formed so as to extend upward from the outer peripheral edge portion of bottom plate 40. Long side walls 41 and 42 are arranged in arrangement direction D1 while end side walls 43 and 44 are arranged in width direction W.

Long side wall 41 is provided with an insertion hole 45 through which bus bar 22 is inserted. Long side wall 42 is provided with an insertion hole 46 through which bus bar 23 is inserted. Insertion hole 45 is formed at the position closer to end side wall 43 than to end side wall 44. Insertion hole 46 is formed at the position closer to end side wall 44 than to end side wall 43.

Bottom plate 40 is provided with a protruding portion 50 and guide poles 51, 52 and 53.

Protruding portion 50 is formed in a corner portion formed of end side wall 44 and long side wall 42. Protruding portion 50 is formed so as to protrude upward from the upper surface of bottom plate 40. The protruding height of protruding portion 50 is greater than the thickness of connection plate 33.

Guide poles 51, 52, and 53 extend upward from the upper surface of bottom plate 40. Guide pole 51 is formed so as to protrude from the inner surface of end side wall 43 in width direction W. The upper end portion of guide pole 51 reaches the upper end of end side wall 43.

Guide pole 52 is formed so as to protrude from the inner surface of long side wall 41 in arrangement direction D1. The upper end portion of guide pole 52 reaches the upper end of long side wall 41. Guide pole 52 is formed closer to end side wall 44 with respect to insertion hole 45.

Guide pole 53 is formed so as to protrude from the inner surface of end side wall 44 in width direction W. The upper end portion of guide pole 53 is formed so as to reach the upper end of end side wall 44. Guide pole 53 is formed at the position closer to long side wall 41 than to long side wall 42.

Elastic members 34 and 35 are disposed on the upper surface of bottom plate 40 and formed so as to extend upward from the upper surface of bottom plate 40. Specifically, elastic members 34 and 35 each are formed by winding a coil wire so as to surround the winding axis line extending in the up-down direction.

Elastic member 34 is disposed in the vicinity of the inner surface of long side wall 42 and located in the center of long side wall 42 in width direction W. Elastic member 35 is disposed at a corner portion formed of end side wall 44 and long side wall 41. Nuts 55 and 56 are embedded in bottom plate 40.

Nut 55 is provided at the position closer to end side wall 43 than to end side wall 44. Nut 56 is provided at the position closer to end side wall 44 than to end side wall 43.

Connection plate 33 is made of a metal material such as aluminum or copper. Connection plate 33 is formed in an approximately rectangular shape. Connection plate 33 includes long sides 60, 61 and end sides 62 and 63. Long sides 60 and 61 are arranged in arrangement direction D1. Each of long sides 60 and 61 is formed so as to extend in width direction W.

End side 62 is provided with a cut-out portion 64 while long side 60 is provided with a cut-out portion 65. End side 63 is provided with a protruding portion 66. Protruding portion 66 is formed so as to protrude from end side 63 in width direction W.

Connection plate 33 is provided with insertion holes 67 and 68. Insertion hole 67 is formed closer to end side 62 than to end side 63 while insertion hole 68 is formed closer to end side 63 than to end side 62.

Figure 5:
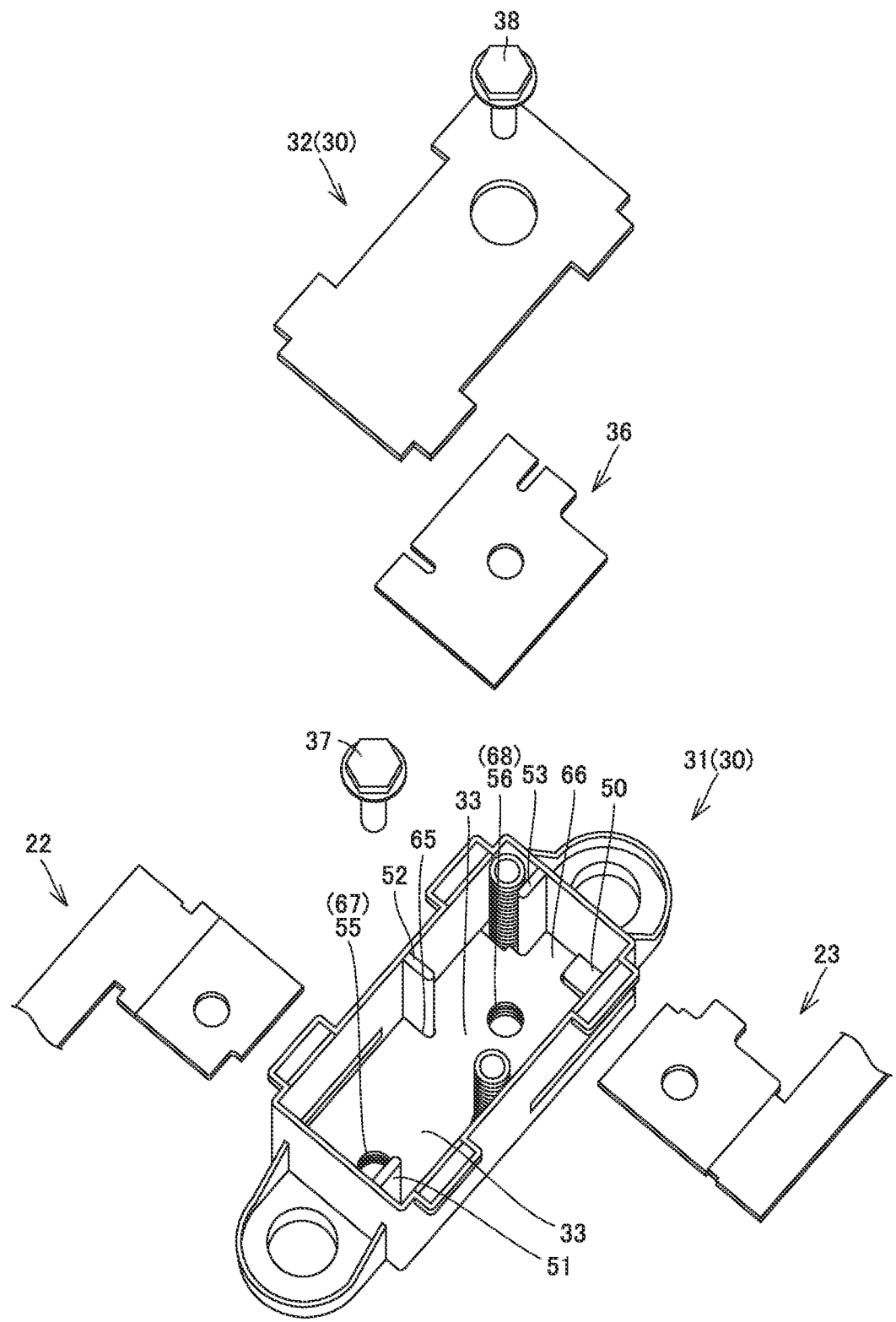
FIG. 5 is an exploded perspective view showing the state where a connection plate 33 is attached to a case body 31.

FIG. 5 is an exploded perspective view showing the state where connection plate 33 is attached to case body 31. In FIGS. 5 and 4, connection plate 33 is disposed on the upper surface of bottom plate 40.

Guide pole 51 is inserted into cut-out portion 64 of connection plate 33. Guide pole 52 is inserted into cut-out portion 65. Furthermore, protruding portion 66 of connection plate 33 is disposed in a recess formed between guide pole 53 and protruding portion 50.

In this way, connection plate 33 is supported by guide poles 51, 52 and 53 and protruding portion 50, so that rotation and positional misalignment of connection plate 33 are suppressed.

Also, insertion hole 67 of connection plate 33 is in communication with the through hole of nut 55. Insertion hole 68 is in communication with the through hole of nut 56.

In FIG. 4, bus bar 22 includes a mount 70, a wire interconnection board 71, and a cover insulation member 72. Bus bar 22 is made of a metal material such as aluminum or copper.

Bus bar 22 is formed in a flat plate shape. Mount 70 is formed at one end of bus bar 22 and inserted into connection unit 20.

Wire interconnection board 71 is connected to mount 70 and positive electrode terminal 7 of power storage cell 5 shown in FIG. 1. Cover insulation member 72 is formed so as to cover a part of mount 70 and wire interconnection board 71. Cover insulation member 72 is made of an insulating material such as a resin. Mount 70 is provided with an insertion hole 73.

Figure 6:
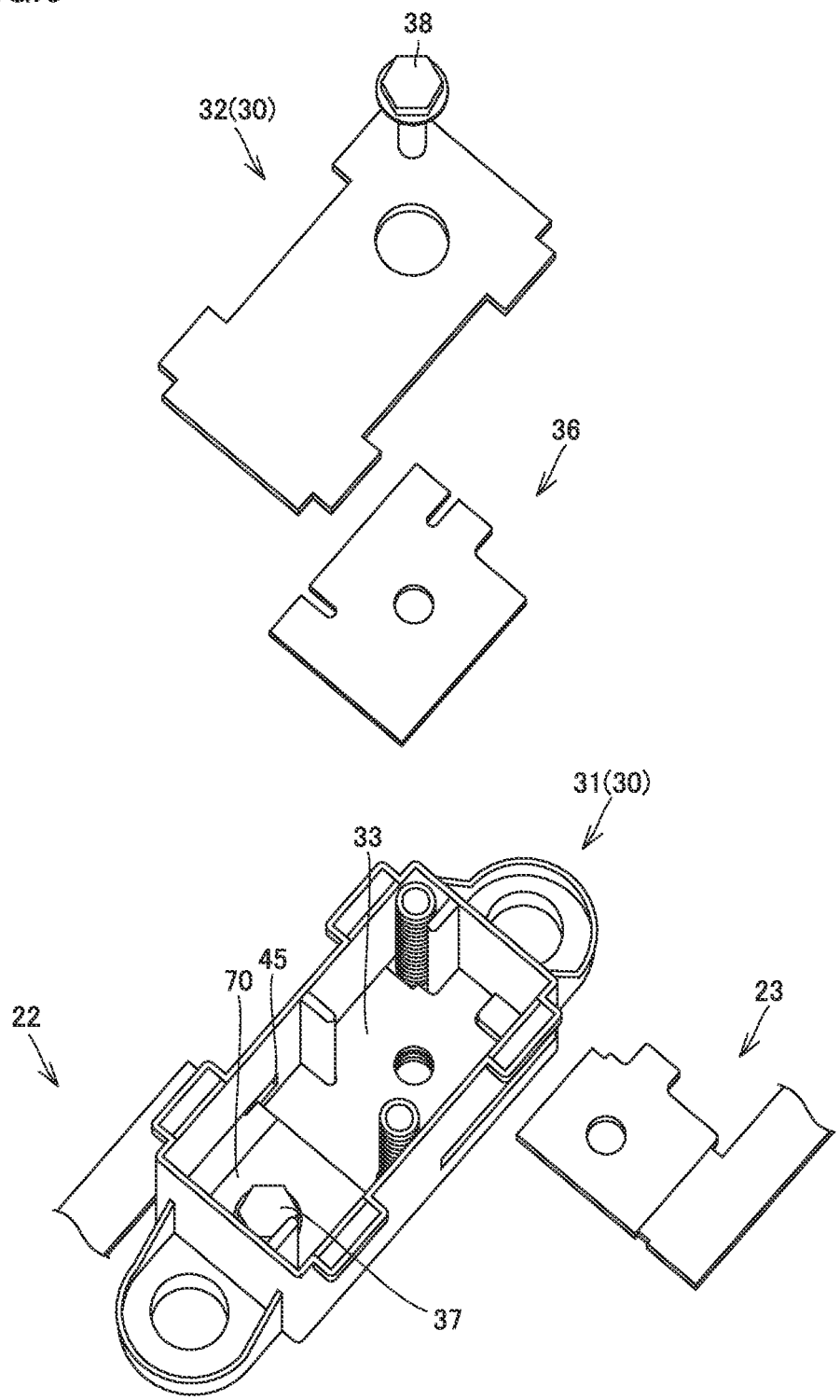
FIG. 6 is an exploded perspective view showing the state where a mount 70 of bus bar 22 is inserted into a housing case 30.

FIG. 6 is an exploded perspective view showing the state where mount 70 of bus bar 22 is inserted into housing case 30. In FIGS. 4 and 6, mount 70 of bus bar 22 is inserted into housing case 30 through insertion hole 45 of housing case 30.

Mount 70 of bus bar 22 is disposed on the upper surface of connection plate 33. In this case, in FIG. 4, insertion hole 73 of bus bar 22, insertion hole 67 of connection plate 33, and the through hole of nut 55 are disposed so as to be in communication with one another.

Bolt 37 includes a head portion 74 and a shank portion 75. Shank portion 75 extends downward from the lower surface of head portion 74. Shank portion 75 has a circumferential surface on which a screw thread is formed.

Shank portion 75 is inserted into insertion hole 73 of bus bar 22, insertion hole 67 of connection plate 33, and the through hole of nut 55. An internal thread adapted to the screw thread of shank portion 75 is formed on the inner circumferential surface of the through hole of nut 55. The lower end portion of shank portion 75 is inserted into nut 55. Shank portion 75 is screwed into nut 55.

Bus bar 22 and connection plate 33 are sandwiched between head portion 74 of bolt 37 and nut 55, so that bus bar 22 and connection plate 33 are brought into close contact with each other. Thereby, bus bar 22 and connection plate 33 are electrically connected to each other while an increase in the resistance between bus bar 22 and connection plate 33 is suppressed.

In FIG. 4, bus bar 23 includes a mount 80, a wire interconnection board 81, and a cover insulation member 82. Mount 80 and wire interconnection board 81 each are made of a metal material such as aluminum or copper. Mount 80 is formed at the end portion of bus bar 23 and inserted into housing case 30. Mount 80 is formed in a flat plate shape and provided with an insertion hole 83 in its center portion. A protruding portion 84 is formed along the outer peripheral edge portion of mount 80.

Wire interconnection board 81 is connected to mount 80 and connection unit 21 that is shown in FIG. 1. Cover insulation member 82 is formed so as to cover the surface of wire interconnection board 81. Cover insulation member 82 is made of an insulating material such as a resin.

Figure 7:
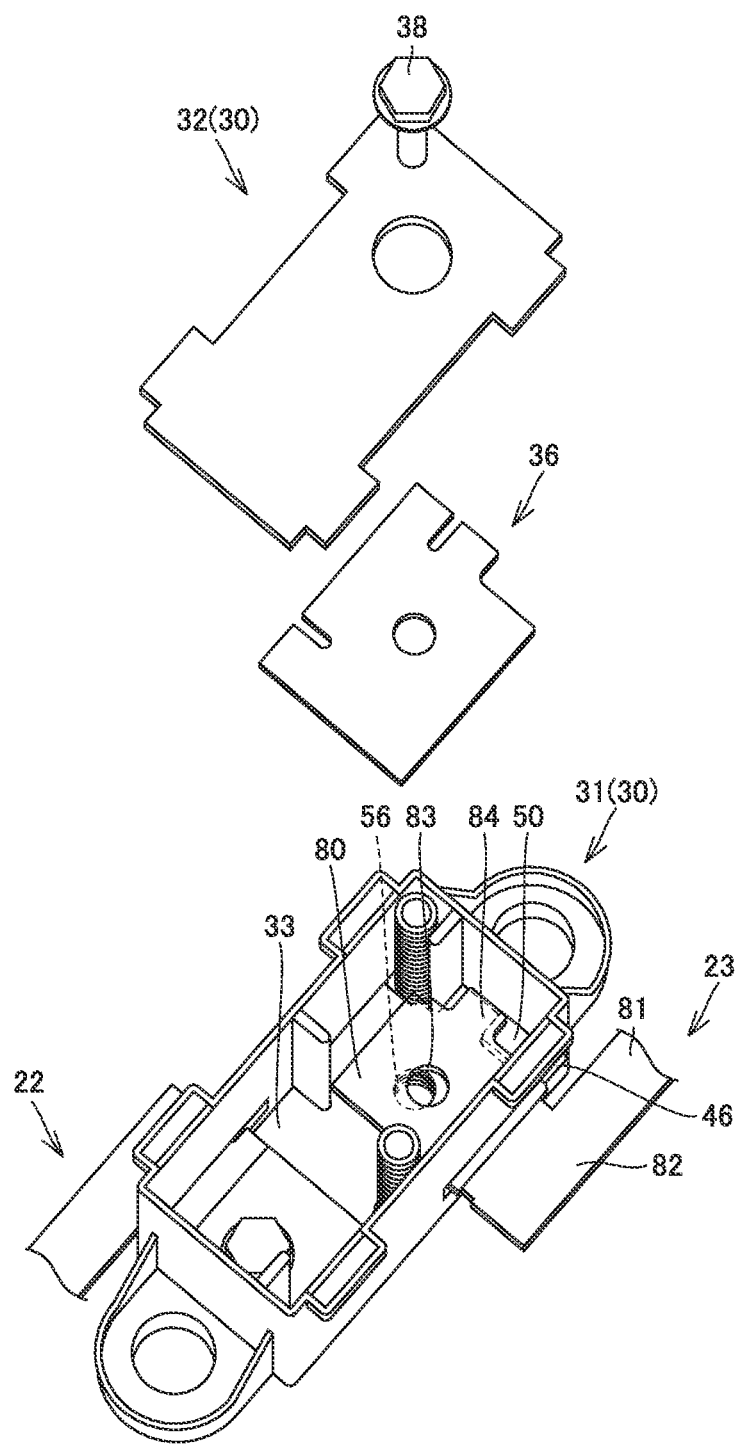
FIG. 7 is an exploded perspective view showing the state where insertion of a mount 80 of bus bar 23 is started.

Mount 80 is inserted into housing case 30 through insertion hole 46. In FIG. 7, the upper surface of protruding portion 50 protrudes upward from the upper surface of connection plate 33. Accordingly, a recess is formed in the region above the upper surface of connection plate 33 between protruding portion 50 and guide pole 53.

Then, as shown in FIG. 7, when mount 80 is inserted into housing case 30 through insertion hole 46, mount 80 moves along the upper surface of protruding portion 50.

Figure 8:
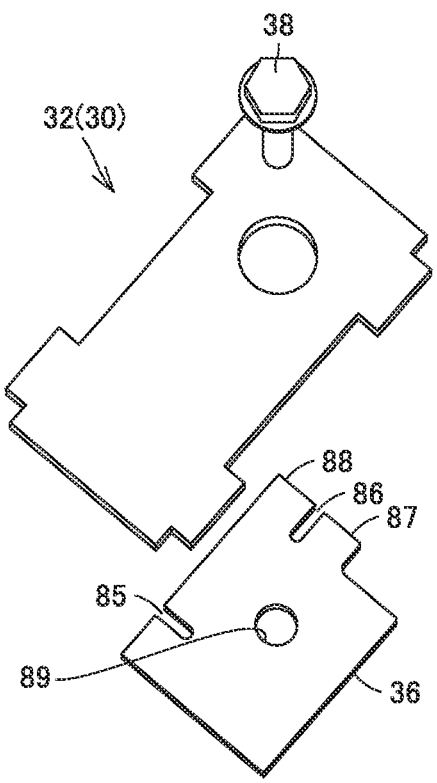
FIG. 8 is an exploded perspective view showing the state where insertion of mount 80 of bus bar 23 is completed.
Figure 8:
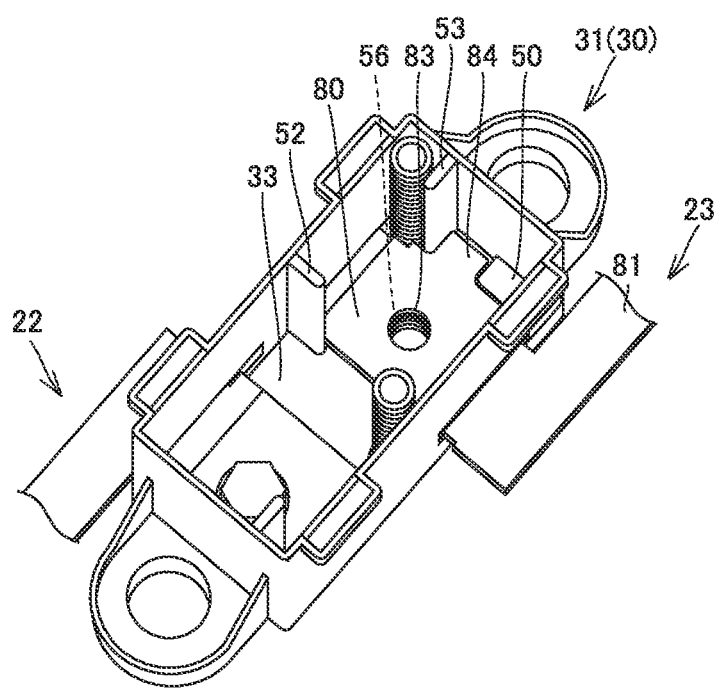

When protruding portion 84 of mount 80 is moved past protruding portion 50, protruding portion 84 fits into the recess between guide pole 53 and protruding portion 50, as shown in FIG. 8. Furthermore, mount 80 is also brought into contact with guide pole 52 and positioned inside housing case 30.

Thus, even when wire interconnection board 81 is pulled, mount 80 is get caught on protruding portion 50, so that pulling out of bus bar 23 is suppressed.

In the state where protruding portion 84 of mount 80 fits in the recess between guide pole 53 and protruding portion 50, insertion hole 83 of mount 80 and the through hole of nut 56 are in communication with each other.

Metal plate 36 is formed in a plate shaped and made of a metal material such as aluminum or copper. Also, cut-out portions 85, 86 and protruding portions 87, 88 are formed along the outer peripheral edge portion of metal plate 36. Cut-out portion 86 is located between protruding portion 87 and protruding portion 88.

Figure 9:
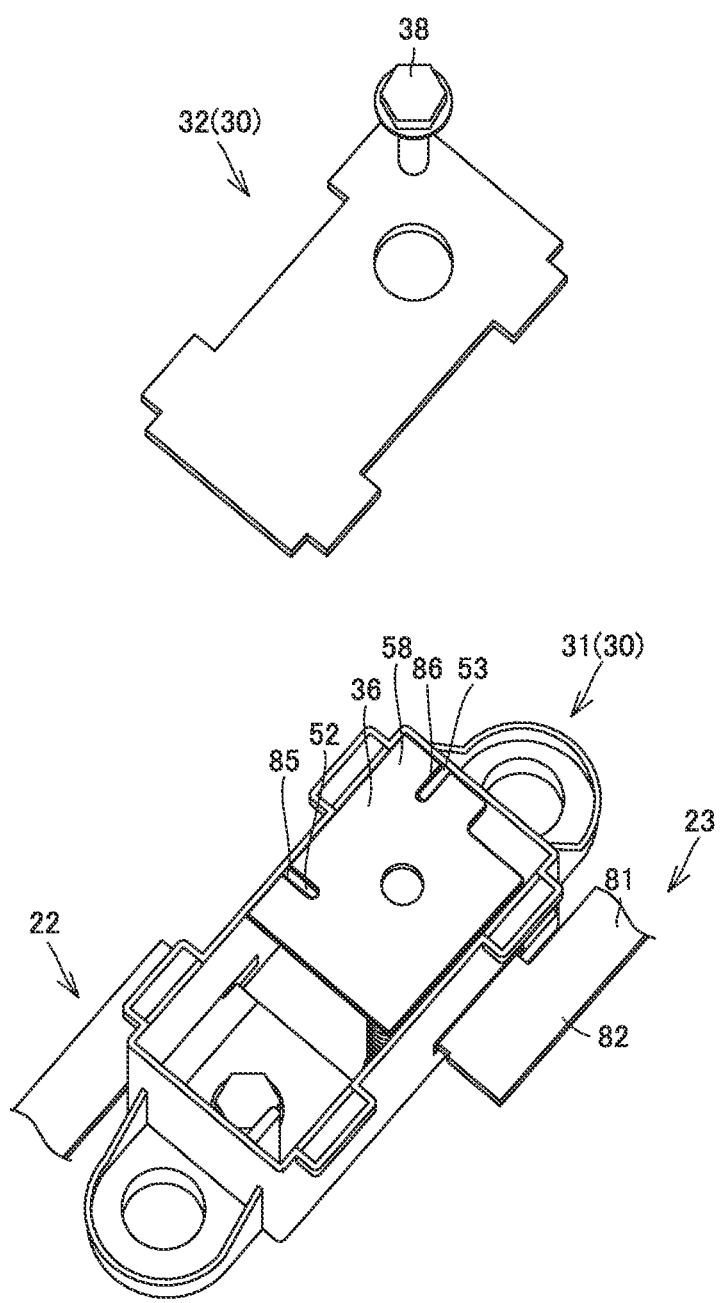
FIG. 9 is an exploded perspective view showing the state where a metal plate 36 is disposed inside housing case 30.

FIG. 9 is an exploded perspective view showing the state where metal plate 36 is disposed inside housing case 30. In the state shown in FIGS. 4 and 9, metal plate 36 is disposed on the upper ends of elastic members 34 and 35. For example, protruding portion 88 is disposed on the upper end portion of elastic member 35. Each of elastic members 34 and 35 urges metal plate 36 in the upward direction.

Then, guide pole 52 is inserted into cut-out portion 85 while guide pole 53 is inserted into cut-out portion 86. Since metal plate 36 is supported by a plurality of guide poles 52 and 53, rotation and positional misalignment of metal plate 36 are suppressed.

Figure 10:
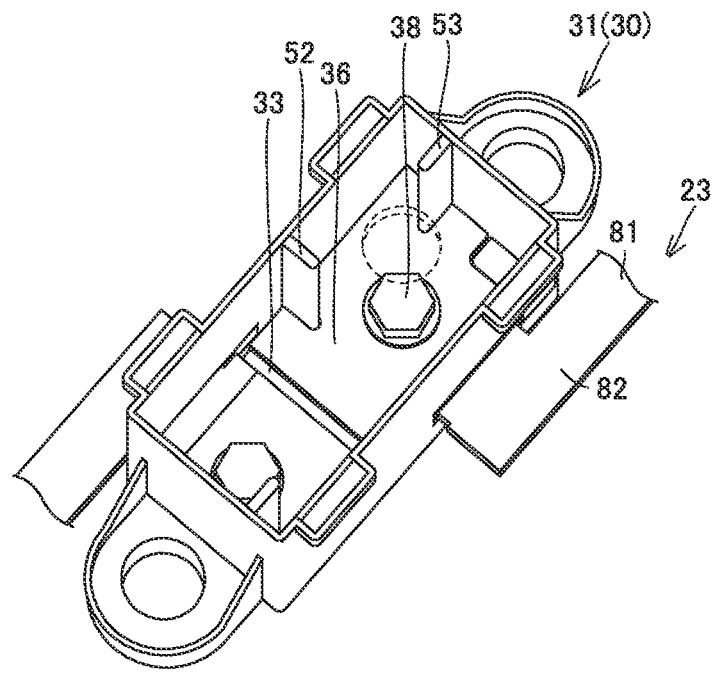
FIG. 10 is a perspective view showing the state where metal plate 36 is fixed with a bolt 38.

FIG. 10 is a perspective view showing the state where metal plate 36 is fixed with a bolt 38. In the state shown in FIG. 10, metal plate 36 is pressed downward against the urging force from elastic members 34 and 35 shown in FIG. 4.

When metal plate 36 is moved in the up-down direction, metal plate 36 is guided by guide poles 52 and 53, so that rotation or the like of metal plate 36 is suppressed.

Figure 11:
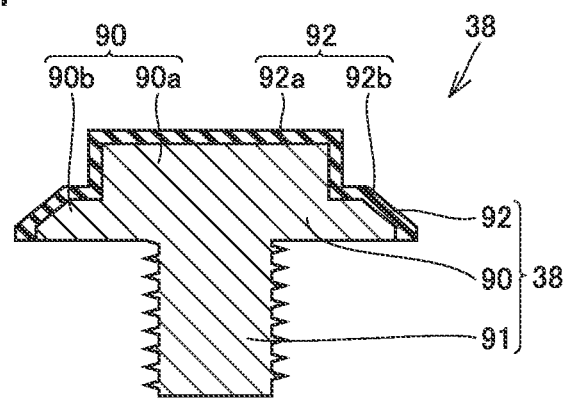
FIG. 11 is a cross-sectional view showing bolt 38.

FIG. 11 is a cross-sectional view showing bolt 38. Bolt 38 includes a head portion 90, a shank portion 91, and an insulation member 92.

Head portion 90 includes a protruding portion 90a and a flange portion 90b. Flange portion 90b is formed on the circumferential surface and on the lower surface side of protruding portion 90a so as to protrude from the circumferential surface of protruding portion 90a in the horizontal direction.

Insulation member 92 is made of an insulating material such as a resin and covers head portion 90 of bolt 38.

Insulation member 92 includes cover portions 92a and 92b. Cover portion 92a covers protruding portion 90a of head portion 90. Cover portion 92b is formed so as to cover flange portion 90b. In addition, the outer circumferential edge portion of flange portion 90b is also covered by cover portion 92b. A screw thread is formed on the surface of shank portion 91. Shank portion 91 is inserted into the through hole of nut 56 through an insertion hole 89 of metal plate 36, insertion hole 83 of bus bar 23 and insertion hole 68 of connection plate 33 that are shown in FIG. 4. The lower end portion of shank portion 91 is screwed into nut 56.

Then, as bolt 38 is fastened to nut 56, bus bar 23 is pressed against metal plate 36 to thereby bring mount 80 of bus bar 23 into close contact with connection plate 33, so that bus bar 23 and connection plate 33 are electrically connected to each other.

Figure 12:
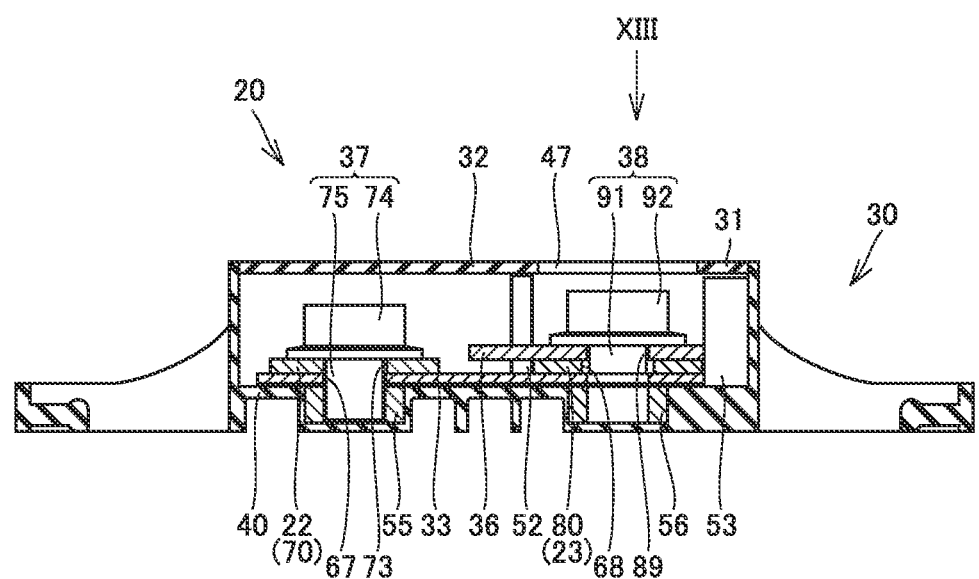
FIG. 12 is a cross-sectional view taken along a line XII-XII shown in FIG. 2.

FIG. 12 is a cross-sectional view taken along a line XII-XII shown in FIG. 2. As shown in FIG. 12, connection unit 20 includes housing case 30, connection plate 33, bus bars 22 and 23, metal plate 36, and bolts 37 and 38.

Connection plate 33 is provided on the upper surface of bottom plate 40 of case body 31. Bus bar 22 is brought into close contact with the upper surface of connection plate 33 by bolt 37 and nut 55. Bus bar 23 is brought into close contact with the upper surface of connection plate 33 by bolt 38 and nut 56. Thereby, bus bars 22 and 23 are electrically connected to each other through connection plate 33.

In the present first embodiment, bus bars 22 and 23 are connected to each other by connection plate 33, bolts 37 and 38, and nuts 55 and 56. In other words, in the present first embodiment, connection plate 33, bolts 37 and 38, and nuts 55 and 56 each function as a fastening member for electrically connecting bus bars 22 and 23. As will be described later, the fastening member does not necessarily have to include all of connection plate 33, bolts 37 and 38, and nuts 55 and 56 as components. The details will be described in the second and third embodiments set forth later.

Figure 13:
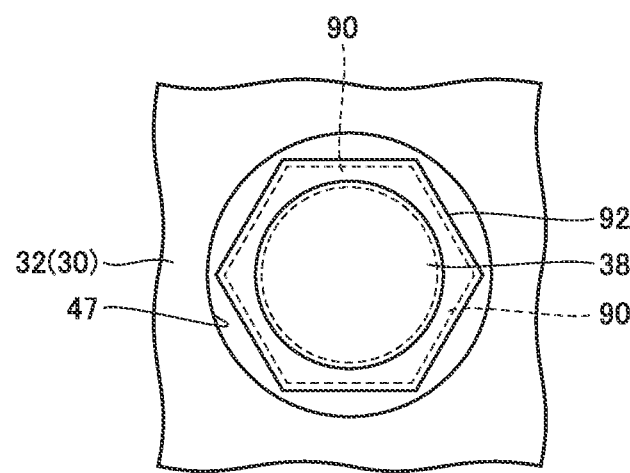
FIG. 13 is a plan view of bolt 38 as seen in the direction indicated by an arrow XIII in FIG. 12.

FIG. 13 is a plan view of bolt 38 as seen in the direction indicated by an arrow XIII in FIG. 12. Specifically, FIG. 13 is a plan view when bolt 38 is seen through tool insertion hole 47 of cover 32 as mentioned above.

As shown in FIG. 13, when bolt 38 is seen through tool insertion hole 47, bolt 38 is disposed directly below tool insertion hole 47. Also, insulation member 92 is disposed in a portion of bolt 38 that is visible through tool insertion hole 47.

Specifically, head portion 90 of bolt 38 is covered by insulation member 92, so that head portion 90 cannot be observed even when bolt 38 is seen through tool insertion hole 47.

Accordingly, even when an operator or the like touches connection unit 20 and the operator's finger is introduced into connection unit 20 through tool insertion hole 47, direct contact of the operator's finger with head portion 90 can be suppressed.

The following is an explanation about the procedure of further connecting bus bar 23 in the state where bus bar 22 is connected in connection unit 20 configured as described above.

Figure 14:
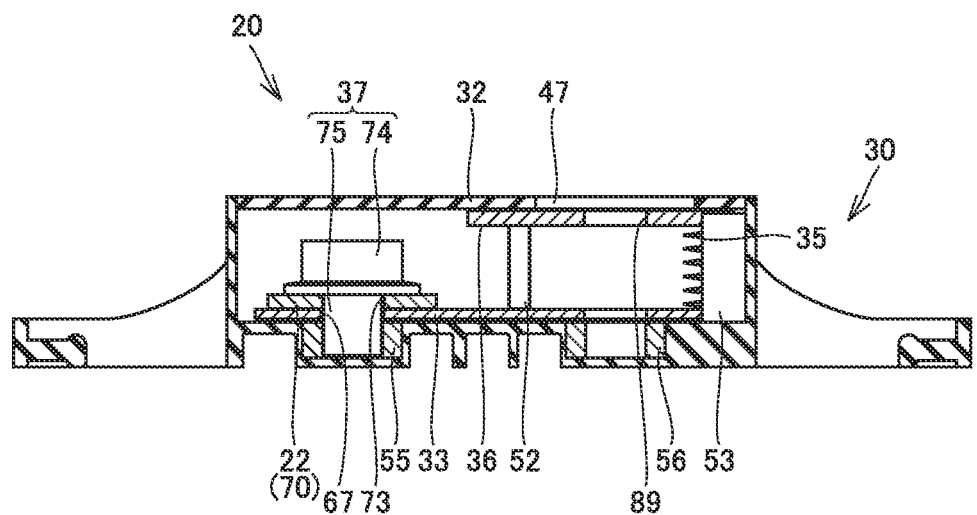
FIG. 14 is a cross-sectional view showing connection unit 20 to which bus bar 22 is connected and bus bar 23 is not connected.

FIG. 14 is a cross-sectional view showing connection unit 20 to which bus bar 22 is connected and bus bar 23 is not connected. In the state shown in FIG. 14, bus bar 22 is inserted into connection unit 20 and electrically connected to connection plate 33 with bolt 37. For example, bus bar 22 is connected to positive electrode terminal 7 of power storage cell 5A in FIG. 1.

Bus bar 23 is not inserted and bolt 38 is not attached. Thus, metal plate 36 is urged upward by the urging force from elastic member 35 and the like, and disposed on the lower surface side of cover 32.

Figure 15:
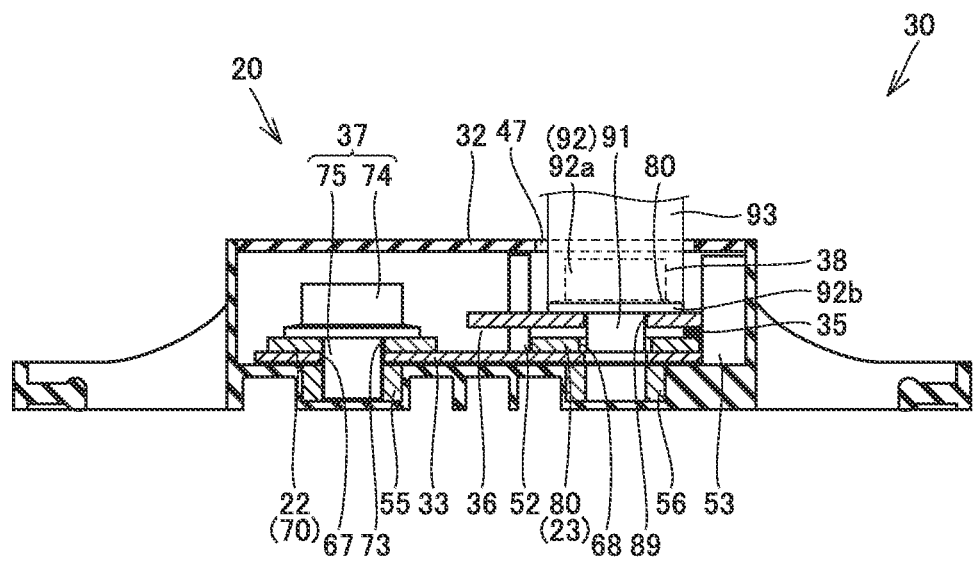
FIG. 15 is a cross-sectional view showing the state where bolt 38 is attached to metal plate 36 and a tool 93 is attached to bolt 38, which is changed from the state shown in FIG. 14.

Then, as shown in FIG. 15, mount 80 of bus bar 23 is inserted into housing case 30.

When mount 80 of bus bar 23 is inserted into housing case 30 through insertion hole 46 as shown in FIG. 7, an operator inserts mount 80 into housing case 30 while gripping cover insulation member 82 because wire interconnection board 81 is covered by cover insulation member 82.

Then, protruding portion 84 formed in mount 80 is moved along the upper surface of protruding portion 50. Then, as shown in FIG. 8, protruding portion 84 is fitted in the recess formed between protruding portion 50 and guide pole 53. Thereby, even when the operator releases bus bar 23, removal and positional misalignment of bus bar 23 can be suppressed.

FIG. 15 is a cross-sectional view showing the state where bolt 38 is attached to metal plate 36 and a tool 93 is attached to bolt 38, which is changed from the state shown in FIG. 14. While gripping insulation member 92 attached to head portion 90, the operator inserts bolt 38 through tool insertion hole 47 into housing case 30 and inserts shank portion 91 of bolt 38 into insertion hole 89 of metal plate 36.

Then, tool 93 is attached to insulation member 92 of bolt 38. Tool 93 has a lower end portion provided with a recess portion, into which cover portion 92a of insulation member 92 is inserted. The lower end portion of tool 93 comes into contact with cover portion 92b of insulation member 92.

In this way, when tool 93 is attached to insulation member 92, tool 93 comes into contact with insulation member 92. Thus, direct contact of tool 93 with head portion 90 is suppressed.

Then, the operator presses bolt 38 downward together with metal plate 36 against the urging force from elastic member 35 and the like. In this case, metal plate 36 is guided by guide pole 53 and the like, so that inclination of metal plate 36 is suppressed.

Then, bolt 38 is fastened to nut 56 to bring bus bar 23 into contact with connection plate 33, so that bus bar 23 and connection plate 33 are electrically connected to each other. In this way, bus bars 22 and 23 are electrically connected to each other through connection plate 33. Then, when tool 93 is pulled out from connection unit 20, the operation of connecting bus bars 22 and 23 is completed.

In this way, the operation of fastening bus bars 22 and 23 is performed inside housing case 30 having an insulation property, so that the operator is suppressed from touching the fastened portion between bus bars 22 and 23 during the operation.

Then, when bus bar 23 is removed, the operator attaches tool 93 to insulation member 92 of bolt 38 to unfasten bolt 38 from nut 56.

When bolt 38 is unfastened from nut 56, metal plate 36 is moved upward by the urging force from elastic member 35 and the like. Specifically, elastic members 34 and 35 shown in FIG. 4 urge metal plate 36 upward, so that bolt 38 attached to metal plate 36 is urged toward tool insertion hole 47. Thereby, shank portion 91 of bolt 38 is removed from insertion hole 83 of bus bar 23. Then, while gripping insulation member 92 of bolt 38, the operator pulls bolt 38 out from connection unit 20.

Then, while gripping cover insulation member 82 of bus bar 23, the operator raises bus bar 23 slightly upward to thereby remove protruding portion 84 from the recess between protruding portion 50 and guide pole 53. Then, the operator pulls bus bar 23 out from housing case 30. In this way, the operation of removing bus bar 23 is completed.

As described above, also in the operation of removing bus bar 23, the operator is suppressed from touching the metal portions of bolt 38 and bus bar 23.

Second Embodiment

Then, a connection module 100 according to the present second embodiment will be hereinafter described with reference to FIG. 16 and the like. Connection module 100 includes connection units 101 and 102, and bus bars 103, 104 and 105.

Connection unit 101 is provided on the upper surface of end plate 9 while connection unit 102 is provided on the upper surface of end plate 14.

Bus bar (the second bus bar) 103 is connected to a positive electrode terminal 7 of a power storage cell 5A and connection unit 101. Bus bar 104 is connected to connection units 101 and 102. Bus bar 105 is connected to connection unit 102 and a negative electrode terminal 13 of a power storage cell 10A. Bus bars 103, 104 and 105 each are a flexible bus bar.

Since connection unit 102 is configured in the same manner as with connection unit 101, the configuration of connection unit 102 will be hereinafter described in detail.

Figure 17:
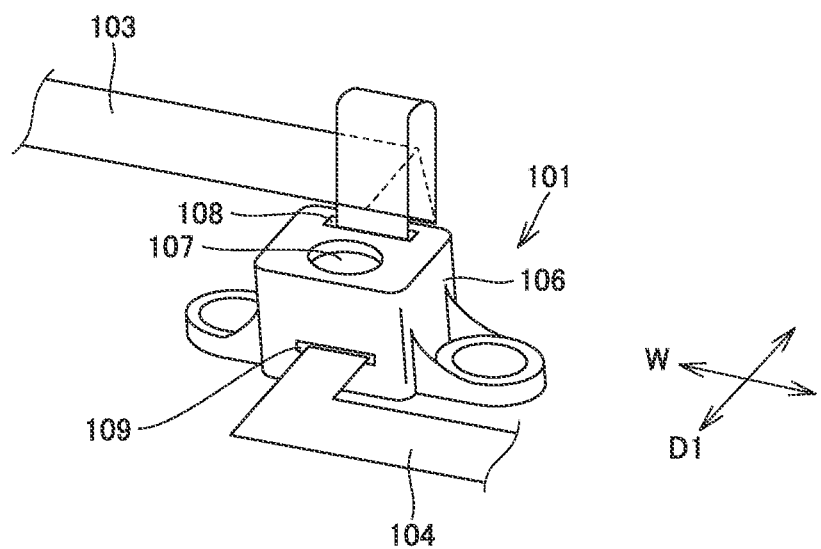
FIG. 17 is a perspective view showing a connection unit 101 and the configuration in the vicinity thereof.

FIG. 17 is a perspective view showing connection unit 101 and the configuration in the vicinity thereof. Connection unit 101 includes a housing case 106. Housing case 106 is made of an insulating material such as a resin. Housing case 106 has an upper surface provided with a tool insertion hole 107 and an insertion hole 108. Housing case 106 has a peripheral surface provided with an insertion hole 109.

One end of bus bar 103 is inserted into insertion hole 108 while one end of bus bar 104 is inserted into insertion hole 109.

Figure 18:
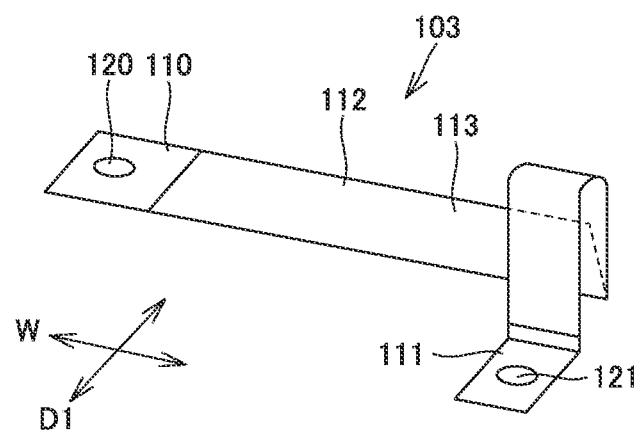
FIG. 18 is a perspective view schematically showing a bus bar 103.

FIG. 18 is a perspective view schematically showing bus bar 103. Bus bar (the second bus bar) 103 includes mounts 110, 111, a wire interconnection body 112, and a cover insulation film 113.

Mount 110 is formed at one end of wire interconnection body 112 while mount (the second mount) 111 is formed at the other end of wire interconnection body 112. An insertion hole 120 is formed in the center portion of mount 110. An insertion hole 121 is formed also in the center portion of mount 111. Wire interconnection body 112 is made of soft copper and the like, for example, and can be flexibly deformed. Cover insulation film 113 is made of an insulating material such as a resin and formed so as to cover the surface of wire interconnection body 112.

In the state shown in FIG. 18 and the like, bus bar 103 extends upward from mount 111 and thereafter is bent so as to extend downward. Then, bus bar 103 is bent so as to extend in width direction W.

Figure 16:
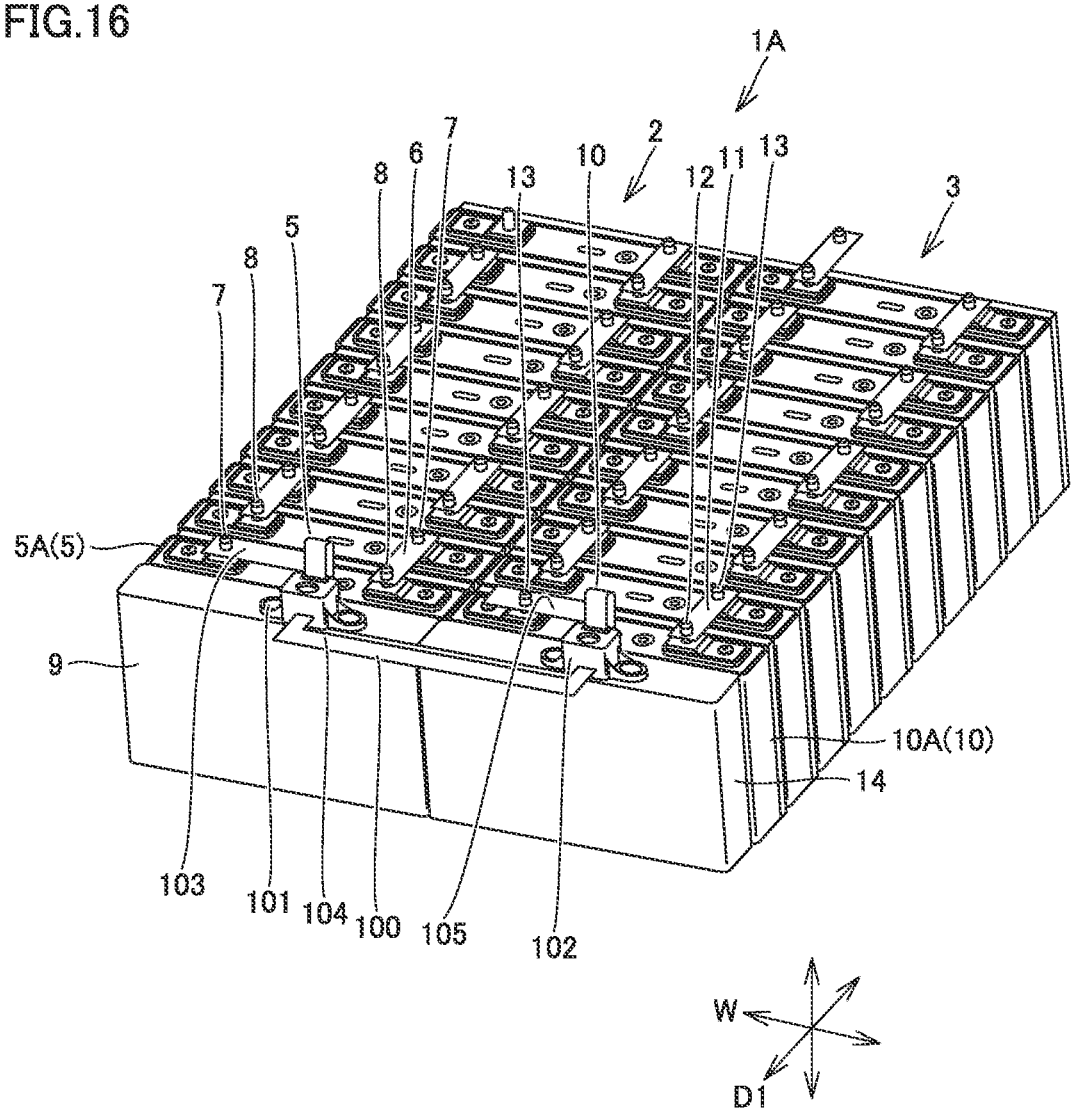
FIG. 16 is a perspective view showing a power storage device 1A according to the second embodiment.

Bus bars 104 and 105 shown in FIG. 16 are different in shape from bus bar 103 but made of the same material as that of bus bar 103.

Figure 19:
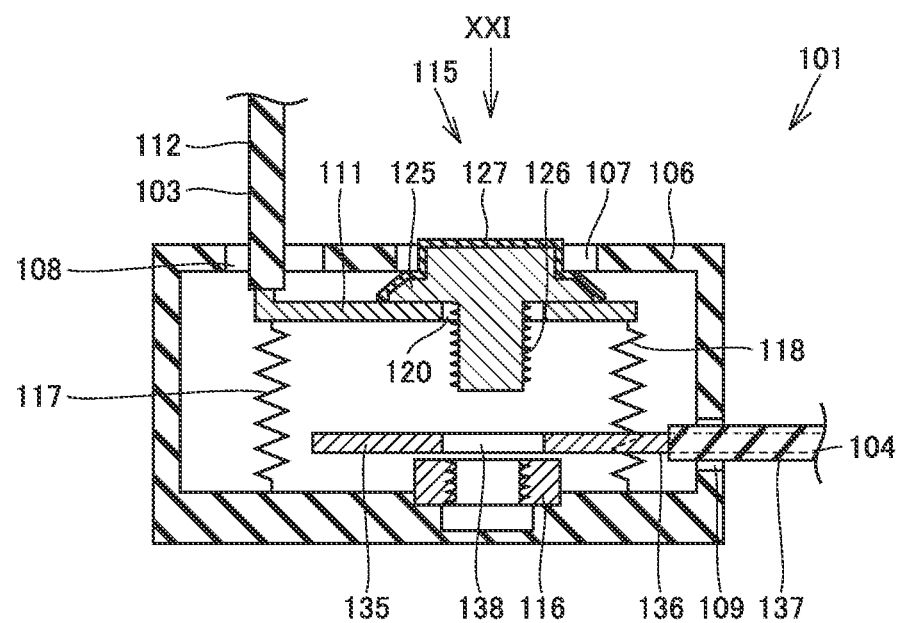
FIG. 19 is a cross-sectional view showing connection unit 101.

FIG. 19 is a cross-sectional view showing connection unit 101. Connection unit 101 includes a housing case 106, a bolt 115, a nut 116, and elastic members 117 and 118. Bolt 115, nut 116 and elastic members 117, 118 are housed inside housing case 106.

Furthermore, mount 111 of bus bar 103 and one end of bus bar 104 are disposed inside housing case 106.

Bus bar (the first bus bar) 104 includes a mount (the first seat portion) 135, a wire interconnection board 136, and an insulation member 137. Mount 135 is formed at one end of wire interconnection board 136 and disposed inside housing case 106. Mount 135 is formed in a plate shape. An insertion hole (the first insertion hole) 138 is formed in the center portion of mount 135.

When an operator inserts mount 135 into housing case 106, the operator inserts mount 135 into housing case 106 through insertion hole 109 while gripping insulation member 137.

Nut 116 is fixed to the bottom surface of housing case 106 and provided with a through hole. Bus bar 104 is disposed so as to allow communication between the through hole of nut 116 and insertion hole 138 of bus bar 104. Elastic members 117 and 118 are disposed on the bottom surface of housing case 106. Elastic members 117 and 118 each urge the bottom surface of mount 111 disposed inside housing case 106 in the upward direction.

Figure 20:
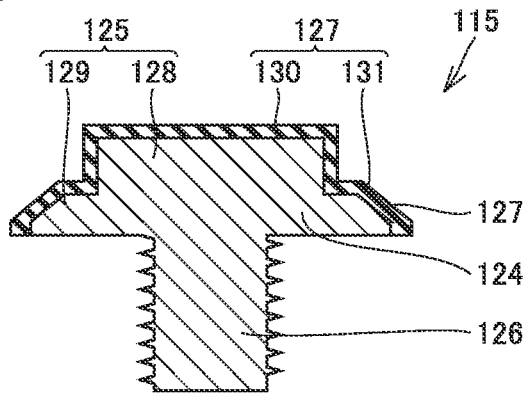
FIG. 20 is a cross-sectional view showing a bolt 115.

FIG. 20 is a cross-sectional view showing bolt 115. Bolt 115 includes a head portion 125, a shank portion 126, and an insulation member 127. Head portion 125 includes a protruding portion 128 and a flange portion 129. Flange portion 129 is formed on the lower surface side of protruding portion 128 so as to protrude from the circumferential surface of protruding portion 128 in the horizontal direction.

Insulation member 127 is formed so as to cover head portion 125. Specifically, insulation member 127 includes a cover portion 130 for covering protruding portion 128 and a cover portion 131 for covering flange portion 129.

In FIG. 19, insertion hole 120 of bus bar 103 is located below tool insertion hole 107, and shank portion 126 of bolt 115 is inserted into insertion hole 120. Head portion 125 of bolt 115 is disposed on the upper surface of mount 111 of bus bar 103.

Figure 21:
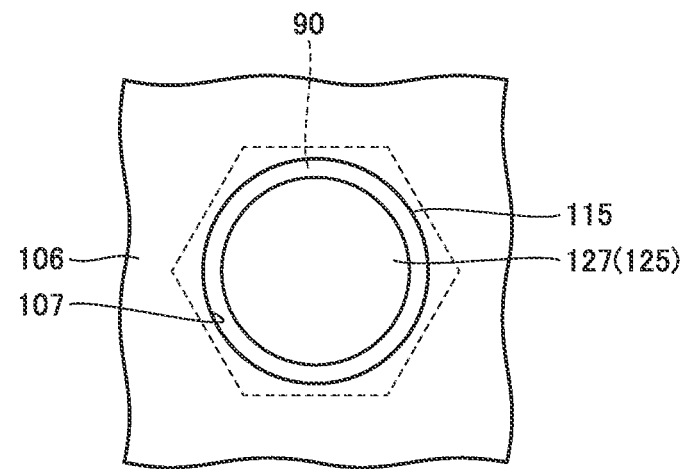
FIG. 21 is a plan view showing a tool insertion hole 107 and bolt 115 as seen in the direction indicated by an arrow XXI shown in FIG. 19.

FIG. 21 is a plan view showing tool insertion hole 107 and bolt 115, as seen in the direction indicated by an arrow XXI shown in FIG. 19.

Head portion 125 of bolt 115 is located below tool insertion hole 107. Also, the outer circumferential edge portion of head portion 125 of bolt 115 is greater than the opening edge portion of tool insertion hole 107. When bolt 115 is seen through tool insertion hole 107, insulation member 127 is located and head portion 125 of bolt 115 is covered by insulation member 127.

Accordingly, even when the operator's finger is introduced into housing case 106 through tool insertion hole 107, contact of the operator's finger with head portion 125 is suppressed.

Then, the operation of electrically connecting bus bars 104 and 103 will be hereinafter described with reference to FIG. 22 and the like.

Figure 22:
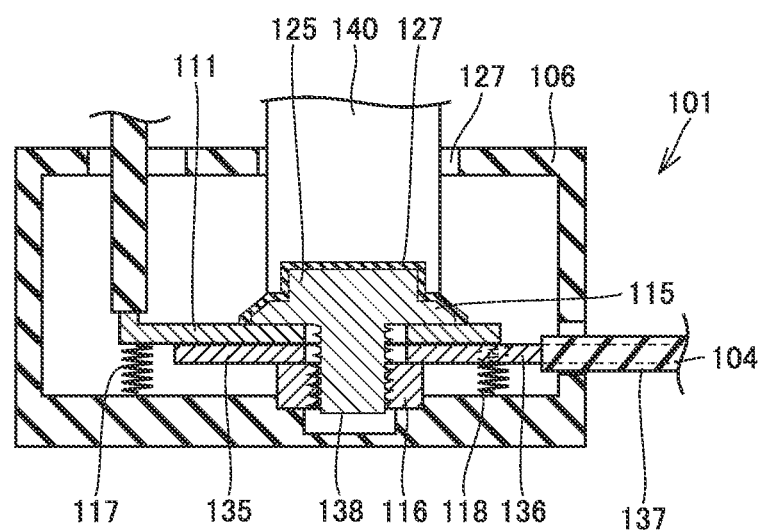
FIG. 22 is a cross-sectional view showing the process of bringing mounts 111 and 135 into close contact with each other with bolt 115 and a nut 116 by using a tool 140.

FIG. 22 is a cross-sectional view showing the process of bringing mounts 111 and 135 into close contact with each other with bolt 115 and nut 116 by using a tool 140.

The operator inserts tool 140 into housing case 106 through tool insertion hole 107. Tool 140 has a lower end portion provided with a recess portion, into which cover portion 130 of insulation member 127 is inserted. In this case, the lower end portion of tool 140 is in contact with insulation member 127 but is not in contact with head portion 125 of bolt 115.

Then, the operator displaces tool 140 downward against the urging force from elastic members 117 and 118, to thereby move mount 111 and bolt 115 downward.

Then, shank portion 126 of bolt 115 is inserted into the through hole of nut 116. In this case, an internal thread adapted to the screw thread formed on the circumferential surface of shank portion 126 is formed on the inner circumferential surface of the through hole of nut 116.

Then, by rotating tool 140, bolt 115 is screwed into nut 116. Thereby, mounts 135 and 111 are brought into close contact with each other between bolt 115 and nut 116. Thus, bus bars 103 and 104 are electrically connected to each other.

Then, the operator pulls tool 140 out from housing case 106 to complete the operation of connecting bus bars 103 and 104.

In this case, bus bars 103 and 104 are electrically connected to each other by bolt 115 and nut 116. Bolt 115 and nut 116 are fastening members for electrically connecting bus bars 103 and 104. In other words, in the present second embodiment, the fastening member includes bolt 115 and nut 116.

By sandwiching bus bars 103 and 104 between bolt 115 and nut 116, the surface pressure between bus bars 103 and 104 can be increased. Thereby, the electrical resistance between bus bars 103 and 104 can be reduced. As compared with the case where a fastening member such as a clip is employed, a fastening member including bolt 115 and nut 116 can be reduced in size and can produce greater surface pressure.

Also, in the present second embodiment as described above, the operator is suppressed from touching head portion 125 and the like of bolt 115 in the process of connecting bus bars 103 and 104.

The following is an explanation about the process of unfastening bus bars 103 and 104 that are fastened to each other, and then pulling bus bar 104 out from housing case 106.

First, in FIG. 22, the operator operates tool 140 to unscrew bolt 115 and nut 116 from each other. Thus, by the urging force from elastic members 117 and 118, mount 111 and bolt 115 are moved upward while bolt 115 is moved toward tool insertion hole 107. Then, as shown in FIG. 19, mount 111 and bolt 115 are moved to the vicinity of tool insertion hole 107. Then, the operator grips insulation member 137 of bus bar 104 to pull bus bar 104 out from housing case 106.

In this way, also in the process of unfastening bus bars 103 and 104 that are fastened, and then pulling bus bar 104 out from housing case 106, the operator is suppressed from touching the metal portions of bus bar 104 and bolt 115.

In this case, mount 111 and bolt 115 are located in the vicinity of tool insertion hole 107. Accordingly, when bus bars 104 and 103 are fastened again, tool 140 can be easily attached to bolt 115. Thereby, the time required to perform the fastening operation can be reduced.

Third Embodiment

Figure 23:
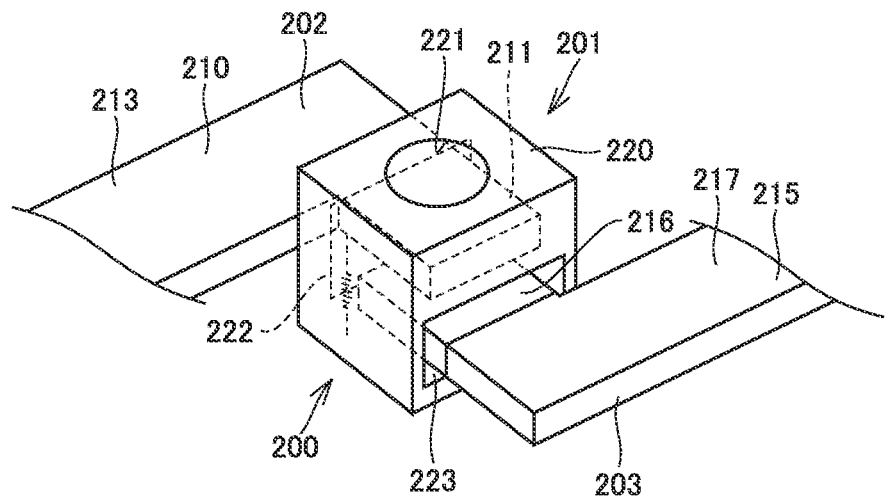
FIG. 23 is a perspective view showing a connection module 200.

Then, a connection module 200 according to the present third embodiment will be hereinafter described with reference to FIG. 23 and the like. FIG. 23 is a perspective view showing connection module 200. Connection module 200 includes a connection unit 201 and bus bars 202 and 203.

Bus bar 202 is connected to positive electrode terminal 7 of power storage cell 5A and connection unit 201.

Bus bar 202 includes a wire interconnection board 210, a mount 211 and an insulation member 213. Mount 211 is provided at one end of wire interconnection board 210 and formed in a plate shape. Insulation member 213 is formed so as to cover the surface of wire interconnection board 210.

Bus bar 203 includes a wire interconnection board 215, a mount 216, and an insulation member 217. Mount 216 is connected to one end of wire interconnection board 215 and formed in a plate shape. Insulation member 217 is formed so as to cover the surface of wire interconnection board 215.

Connection unit 201 includes a housing case 220. Housing case 220 is made of an insulating material such as a resin. Housing case 220 has an upper surface provided with a tool insertion hole 221. Housing case 220 is provided with insertion holes 222 and 223. The side surface of housing case 220 provided with insertion hole 222 faces the side surface of housing case 220 provided with insertion hole 223.

Figure 24:
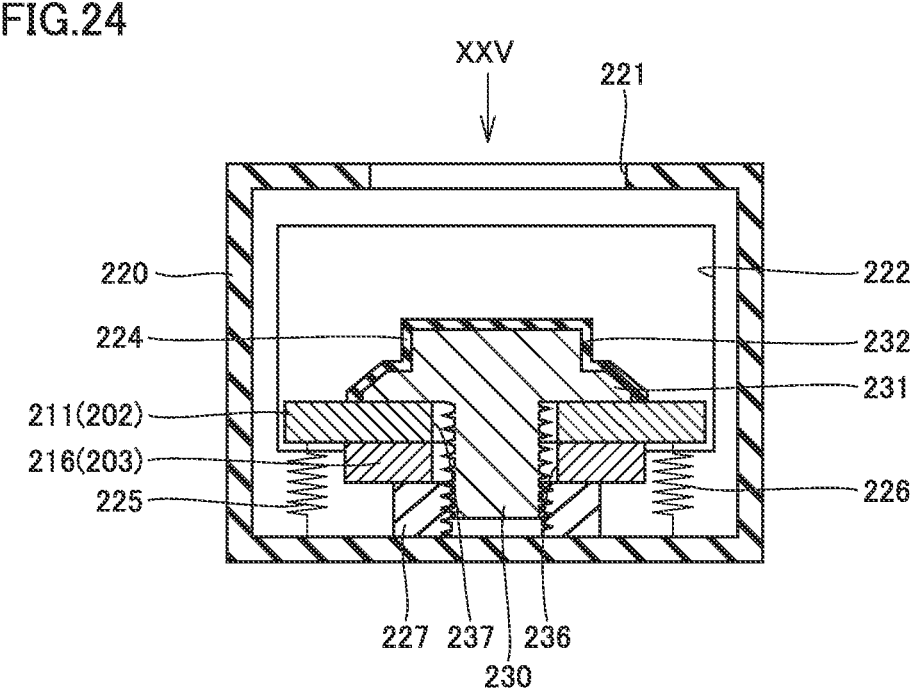
FIG. 24 is a cross-sectional view showing a connection unit 201.

FIG. 24 is a cross-sectional view showing connection unit 201. Connection unit 201 includes a bolt 224 housed in housing case 222, elastic members 225, 226, and a nut 227.

Bolt 224 includes a shank portion 230, a head portion 231, and an insulation member 232. Shank portion 230 is connected to the lower surface of head portion 231. Shank portion 230 has a circumferential surface on which a screw thread is formed. Insulation member 232 is formed so as to cover the upper surface of head portion 231.

Nut 227 is fixed to the bottom surface of housing case 220 and provided with a through hole. On the inner surface of the through hole of nut 227, an internal thread adapted to the screw thread formed on shank portion 230 is formed.

Mount 216 of bus bar 203 is disposed on the upper surface of nut 227. Mount 211 of bus bar 202 is disposed on the upper surface of mount 216.

Mount 216 is provided with an insertion hole 236 while mount 211 is also provided with an insertion hole 237. Insertion holes 236 and 237 and the through hole of nut 227 are in communication with one another.

Shank portion 230 of bolt 224 is inserted through insertion holes 236 and 237 into the through hole of nut 227. The lower end portion of shank portion 230 is screwed in the internal thread formed on the inner circumferential surface of nut 227.

Then, mounts 216 and 211 are sandwiched by bolt 224 and nut 227 such that mounts 216 and 211 are brought into close contact with each other. Thereby, bus bars 203 and 202 are electrically connected to each other.

In this way, in the present third embodiment, bolt 224 and nut 227 each function as a fastening member for electrically connecting bus bars 202 and 203.

In other words, in the present third embodiment, the fastening member includes bolt 224 and nut 227.

Elastic members 225 and 226 are disposed on the bottom surface of housing case 220 and formed so as to protrude upward. The upper end portions of elastic members 225 and 226 are connected to the lower surface of mount 211 of bus bar 202. Elastic members 225 and 226 urge mount 211 upward.

In the state shown in FIG. 24, mounts 216 and 211 are held by bolt 224 and nut 227, and elastic members 225 and 226 are in the contracted state.

Figure 25:
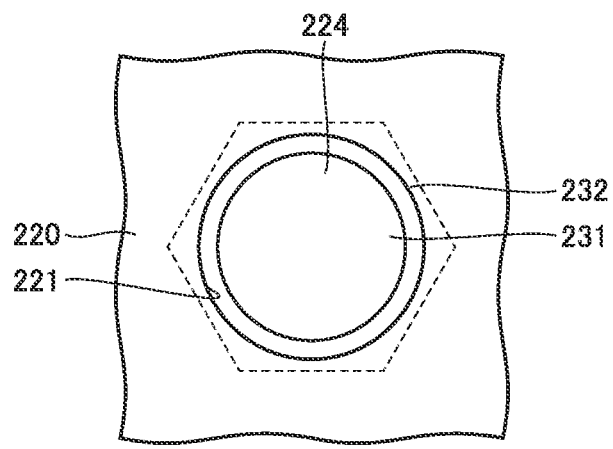
FIG. 25 is a plan view showing a bolt 224 as seen in the direction indicated by an arrow XXV in FIG. 24.

FIG. 25 is a plan view showing bolt 224 as seen in the direction indicated by an arrow XXV in FIG. 24. Specifically, FIG. 25 is a plan view of bolt 224 seen through tool insertion hole 221.

As shown in FIG. 25, when bolt 224 is seen through tool insertion hole 221, only insulation member 232 of bolt 224 is visible.

Accordingly, even when a finger of an operator or the like is introduced into housing case 220 through tool insertion hole 221, the finger of the operator or the like touches insulation member 232. Thus, direct contact of the finger with head portion 231 is suppressed.

The following is an explanation about the process of connecting bus bars 202 and 203 in connection module 200 configured as described above.

Figure 26:
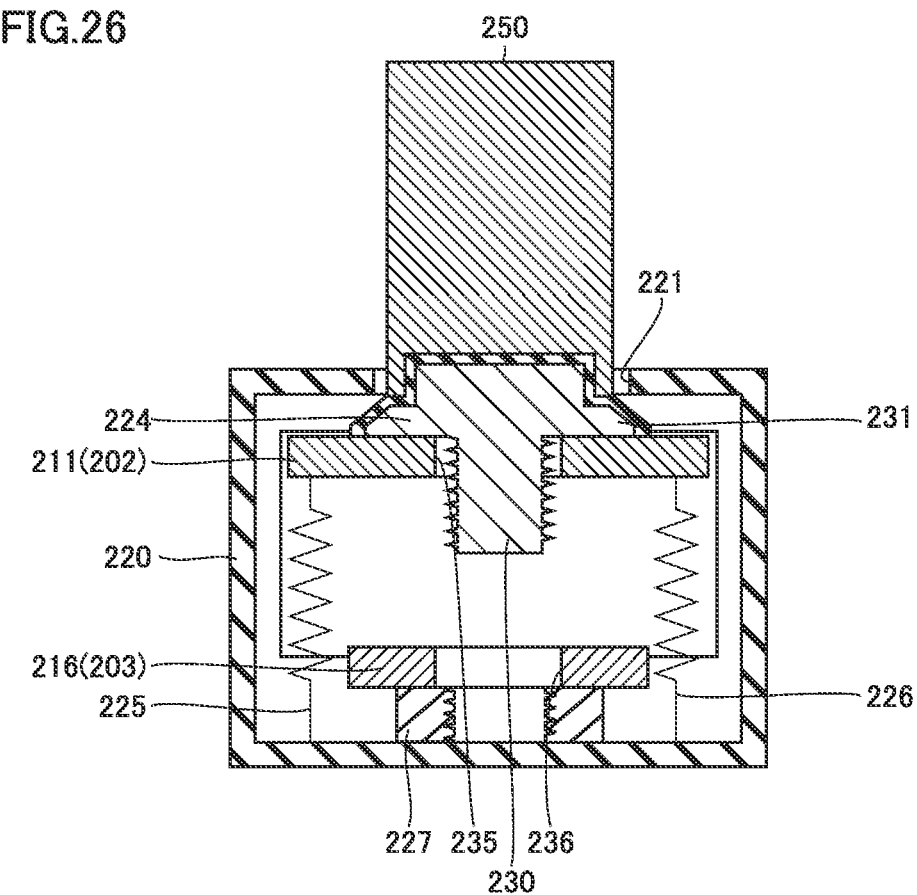
FIG. 26 is a cross-sectional view showing the state where a tool 250 is attached.

FIG. 26 is a cross-sectional view showing the state where a tool 250 is attached. Tool 250 has a lower end portion provided with a recess portion, into which insulation member 232 of bolt 224 is inserted.

Insulation member 232 covers the upper surface of head portion 231. Thus, tool 250 is in contact with insulation member 232 but is not in contact with head portion 231.

Then, the operator displaces tool 250 downward so as to move mount 211 downward against the urging force from elastic members 225 and 226.

Figure 27:
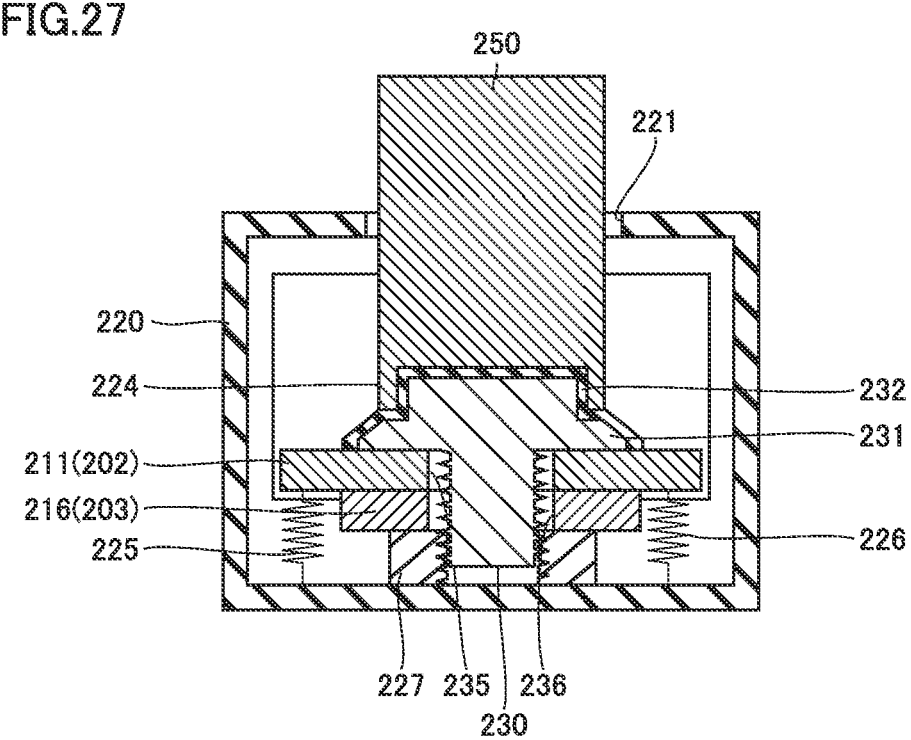
FIG. 27 is a cross-sectional view showing the state where bus bars 202 and 203 are connected.

Then, as shown in FIG. 27, bolt 224 is screwed in nut 227 to bring mounts 211 and 216 into close contact with each other. Thereby, bus bars 202 and 203 are electrically connected to each other.

Then, the operator pulls tool 250 out from tool insertion hole 221 to complete the operation of connecting bus bars 202 and 203. In this way, also in connection unit 201 according to the present third embodiment, the operator's contact with the metal portions of bus bars 202 and 203 or bolt 224 can be suppressed when bus bars 202 and 203 are connected to or disconnected from each other.

The above first to third embodiments have been explained mainly with regard to the fastening member including a bolt and a nut as a fastening member for electrically connecting bus bars to each other, but a fastening member is not limited to the configuration as described above, and various kinds of configurations may be employed. For example, a clip may be employed as a fastening member. When a clip is employed, two bus bars are held by the clip, so that the bus bars are electrically connected to each other.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A connection module comprising:
   a first bus bar;
   a second bus bar; and
   a connection unit configured to electrically connect the first bus bar and the second bus bar,
   the connection unit including
      a housing case having an insulation property and having a housing space formed therein, and
      a fastening member disposed inside the housing space, the connection unit being provided with a tool insertion hole through which an outside of the housing case and the housing space are in communication with each other, and through which a tool to be attached to the fastening member is insertable, the fastening member being configured to electrically connect the first bus bar and the second bus bar that are disposed inside the housing space, an insulation member being disposed in a portion of the fastening member that is visible through the tool insertion hole when the fastening member is seen through the tool insertion hole.

2. The connection module according to claim 1, wherein the tool is in contact with the insulation member when the tool is attached to the fastening member.

3. The connection module according to claim 1, wherein the fastening member includes a nut and a bolt that is adapted to the nut, the bolt includes a head portion and a shank portion that is connected to the head portion, the insulation member is provided in the head portion, and the tool is in contact with the insulation member provided in the head portion when the tool is attached to the bolt.

4. The connection module according to claim 3, further comprising an elastic member disposed inside the housing space, wherein the nut is provided with a through hole, the first bus bar includes a first seat portion provided with a first insertion hole through which the shank portion is inserted, the first seat portion being disposed inside the housing space, the second bus bar includes a second seat portion provided with a second insertion hole through which the shank portion is inserted, the second seat portion being disposed inside the housing space, the first seat portion is disposed in the nut so as to allow communication between the first insertion hole and the through hole, the second seat portion is disposed in the first seat portion so as to allow communication between the second insertion hole and the first insertion hole, the head portion is disposed in the second seat portion, and the elastic member is configured to urge the second seat portion toward the tool insertion hole.

\* \* \* \* \*